US005864055A

United States Patent [19]

Borrione et al.

[11] Patent Number: 5,864,055

[45] **Date of Patent: *Jan. 26, 1999**

[54] METHOD AND UNIT FOR DIAGNOSING MALFUNCTIONING OF THE INJECTORS OF AN INTERNAL COMBUSTION ENGINE HIGH-PRESSURE INJECTION SYSTEM

[75] Inventors: Stefano Maria Borrione, Turin; Riccardo Buratti, Genoa, both of Italy

[73] Assignee: C.R.F. Societa' Consortile Per Azioni, Strada Torino, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 786,478

[22] Filed: Jan. 21, 1997

[30] Foreign Application Priority Data

Jan. 19, 1996 [IT] Italy .................................. T096A0030

[51] Int. Cl.[6] .......................... G01L 23/22; G01M 19/00

[52] U.S. Cl. ........................ 73/35.09; 73/35.03; 73/118.1

[58] Field of Search ............................... 73/35.01, 35.03, 73/35.09, 35.04, 35.11, 117, 118.1, 117.3, 119 R, 119 A, 118.2

[56] References Cited

U.S. PATENT DOCUMENTS

| | | | |
|---|---|---|---|
| 4,215,404 | 7/1980 | Bukhtiyarov et al. | 73/117.3 |
| 4,271,469 | 6/1981 | Kawai et al. | 73/117.3 |
| 4,437,163 | 3/1984 | Kurithara et al. | 73/593 |
| 4,586,369 | 5/1986 | Vogler | 73/117.3 |
| 4,895,121 | 1/1990 | McCoy et al. | 73/35.04 |
| 5,353,644 | 10/1994 | Frank et al. | 73/714 |

*Primary Examiner*—Max H. Noori

*Attorney, Agent, or Firm*—Ladas & Parry

[57] ABSTRACT

The diagnostic method includes the steps of generating an acceleration signal related to the intensity of vibration in an engine; comparing the amplitude of the acceleration signal with a predetermined reference amplitude value; generating a fault indicator when the amplitude of the acceleration signal exceeds the predetermined reference amplitude value; determining a crossover drive angle value upon the amplitude of the acceleration signal exceeding the predetermined reference amplitude value; comparing the crossover drive angle value with a predetermined reference angle value; and generating a fault signal in the event the crossover drive angle value is less than the predetermined reference angle value.

22 Claims, 4 Drawing Sheets

METHOD AND UNIT FOR DIAGNOSING MALFUNCTIONING OF THE INJECTORS OF AN INTERNAL COMBUSTION ENGINE HIGH-PRESSURE INJECTION SYSTEM

BACKGROUND OF THE INVENTION

The present invention relates to a method and unit for diagnosing malfunctioning of the injectors of an internal combustion engine high-pressure injection system.

As is known, high-pressure injection systems comprise a number of injectors for supplying fuel to an internal combustion engine.

One problem of such systems is that, if one or more of the injectors should become jammed in the open position, fuel is supplied continuously to the cylinders, thus resulting, not only in excessive fuel consumption, but also in abnormal combustion characterized by pressure peaks and a considerable increase in temperature inside the cylinders.

Being withstandable by the engine for no more than a short period of time, the above phenomena may result in serious damage to the engine, e.g. to the connecting rod, piston or the injector nozzles.

SUMMARY OF THE INVENTION

It is an object of the present invention to provide a method and unit for diagnosing malfunctioning of the injectors and so enabling fuel supply to the cylinder to be cut of f immediately in the event of an injector jamming in the open position.

According to the present invention, there is provided a method of diagnosing malfunctioning of injectors of an internal combustion engine high-pressure injection system, the method comprising the steps of:

- generating an acceleration signal related to the intensity of vibration in an engine;
- comparing said acceleration signal with reference values; and
- determining a fault condition in the event of a predetermined relationship between said acceleration signal and said reference values.

According to the present invention, there is also provided a unit for diagnosing malfunctioning of injectors of an internal combustion engine high-pressure injection system, characterized by comprising an acceleration sensor generating an acceleration signal related to the intensity of vibration in an engine; comparing means connected to said acceleration sensor to compare said acceleration signal with reference values; and fault detecting means for determining a fault condition in the event of a predetermined relationship between said acceleration signal and said reference values.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
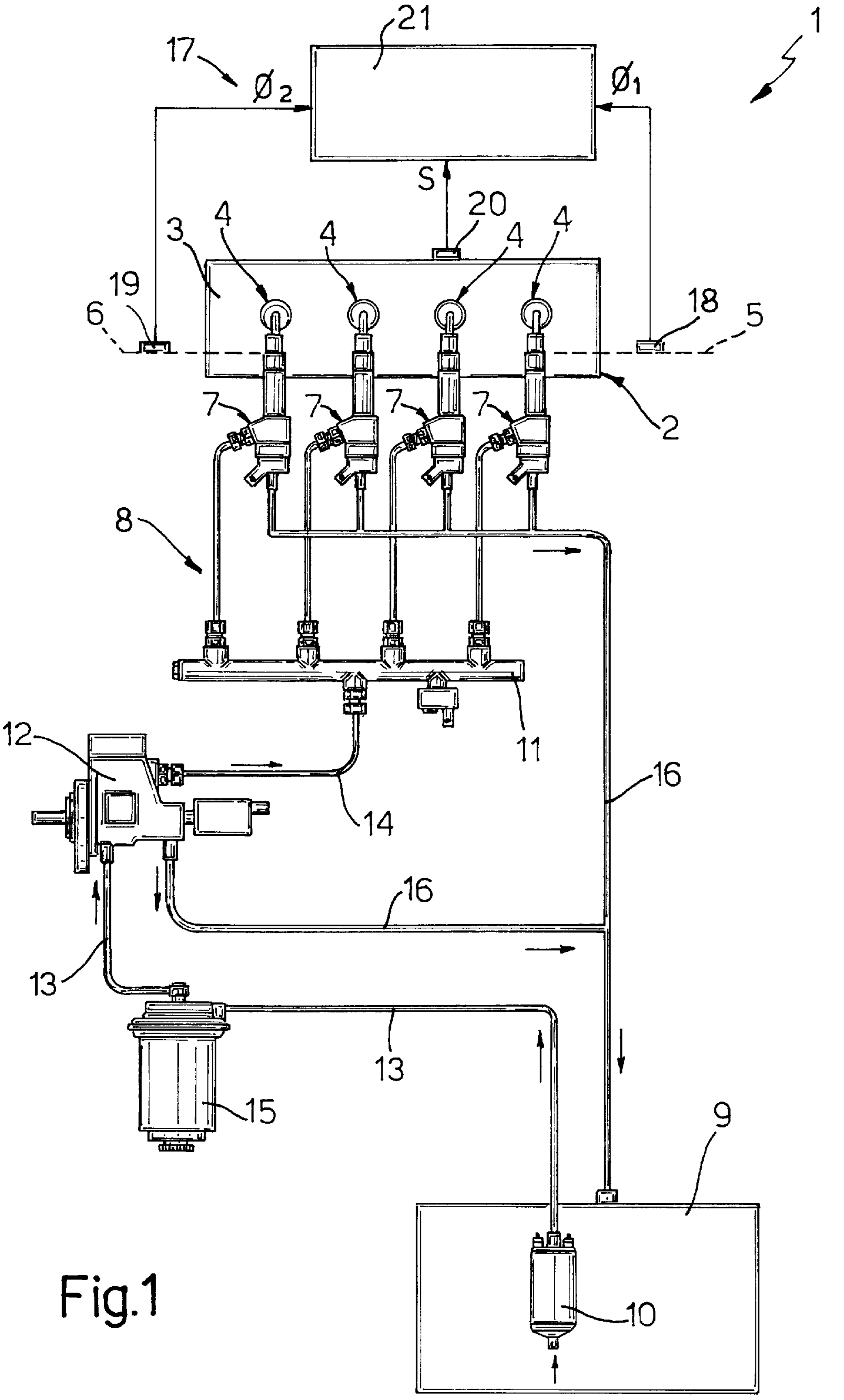
FIG. 1 shows a simplified diagram of a high-pressure injection system comprising a diagnostic unit in accordance with the present invention.

Number 1 in FIG. 1 indicates a high-pressure injection system for a diesel engine 2 comprising a block 3, cylinders 4, a drive shaft 5 (shown schematically), and a camshaft 6 (also shown schematically).

Injection system 1 comprises a number of injectors 7 for supplying fuel to cylinders 4 of engine 2, and in turn supplied by a known "common rail" supply circuit 8.

Supply circuit 8 comprises a fuel tank 9; a delivery pump 10 housed inside tank 9; a known common rail 11; a radial-piston pump 12 connected to delivery pump 10 by a low-pressure delivery line 13, and to common rail 11 by a high-pressure delivery line 14; and a fuel filter 15 located along low-pressure delivery line 13.

Each of injectors 7 and radial-piston pump 12 are also connected to tank 9 by drain lines 16 for feeding part of the fuel, used during operation of the injectors and the pump, back into tank 9 in known manner and therefore not described in detail.

Injection system 1 also comprises a diagnostic unit 17 for detecting malfunctioning of injection system 1.

Figure 2:
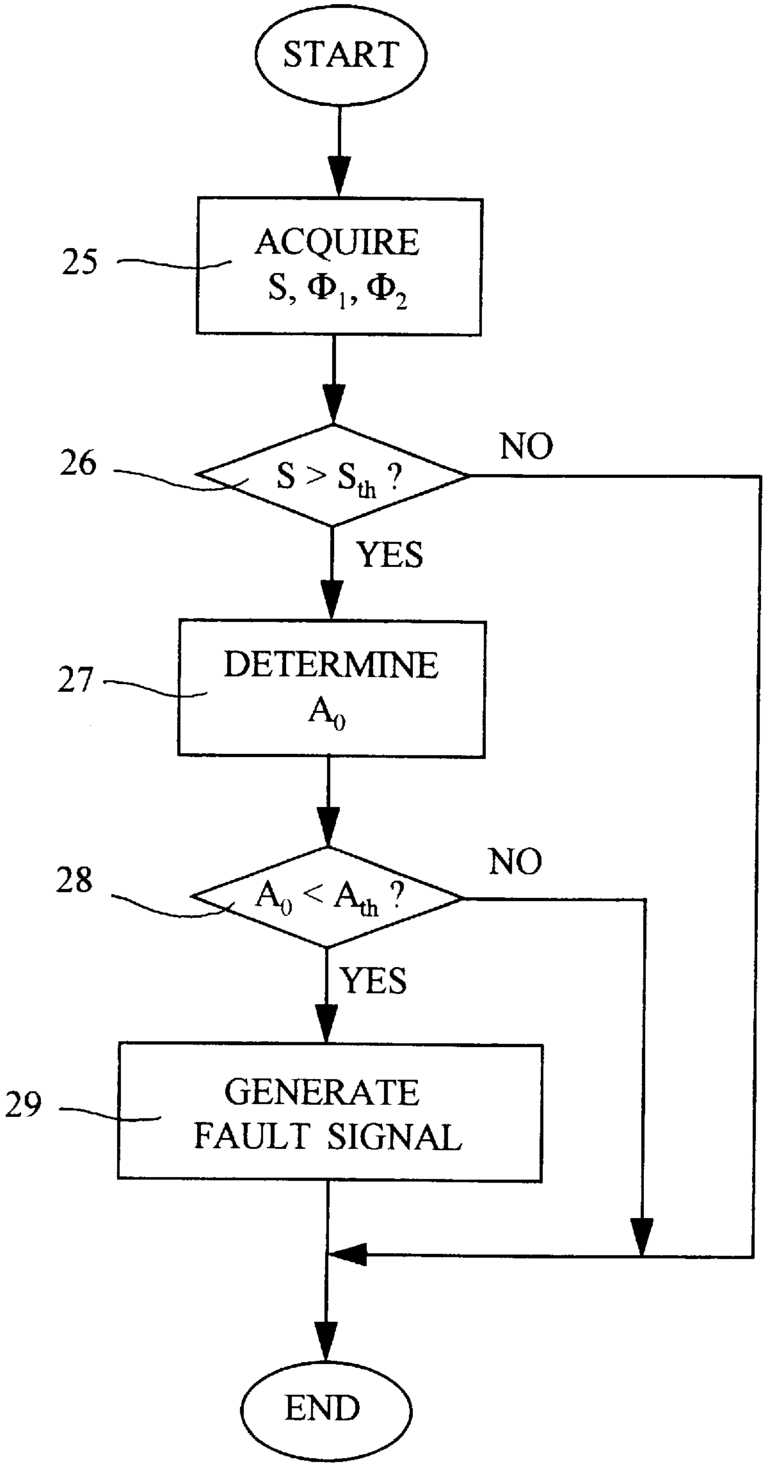
FIG. 2 shows a flow chart of the method according to the invention.

Diagnostic unit 17 comprises a first known position sensor 18 located on drive shaft 5 to generate a first position signal $\Phi_1$ indicating the angular position of drive shaft 5 (drive angle A); a second known position sensor 19 located on camshaft 6 to generate a second position signal $\Phi_2$ indicating the angular position of camshaft 6; a known acceleration sensor 20 located on block 3 of engine 2 to generate an acceleration signal S related to the intensity of vibration present on block 3 and caused by combustion of engine 2; and an electronic central control unit 21 receiving acceleration signal S and position signals $\Phi_1$ and $\Phi_2$ and which implements the diagnostic operations described in detail later on with reference to FIG. 2.

The invention is based on the fact that, when one or more injectors are jammed in the open position, this results in abnormal combustion of engine 2, in turn resulting in far greater vibration as compared with correct combustion; and that such vibration is present even before the instant at which the injection start command is given.

Such abnormal performance is clearly shown by way of comparison in FIGS. 3, 4, 5, and 6.

Figure 3:
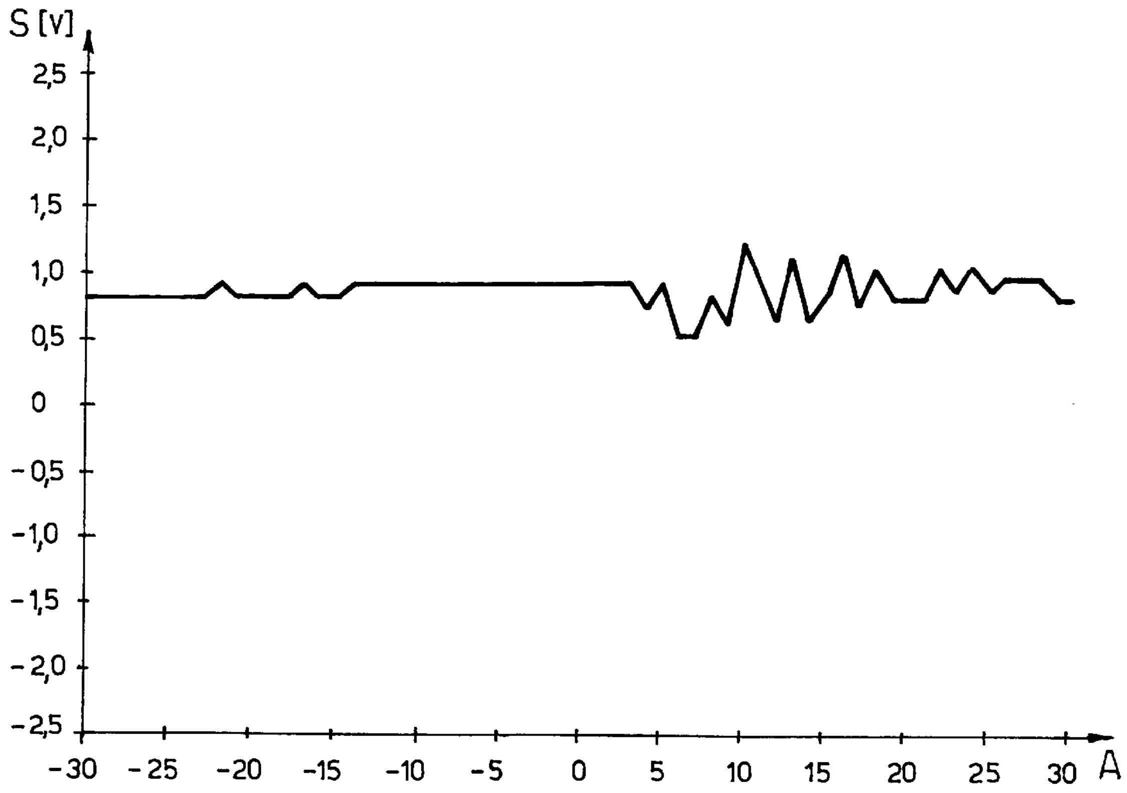
FIGS. 3–6 show graphs of a number of quantities employed in the diagnostic method.
Figure 4:
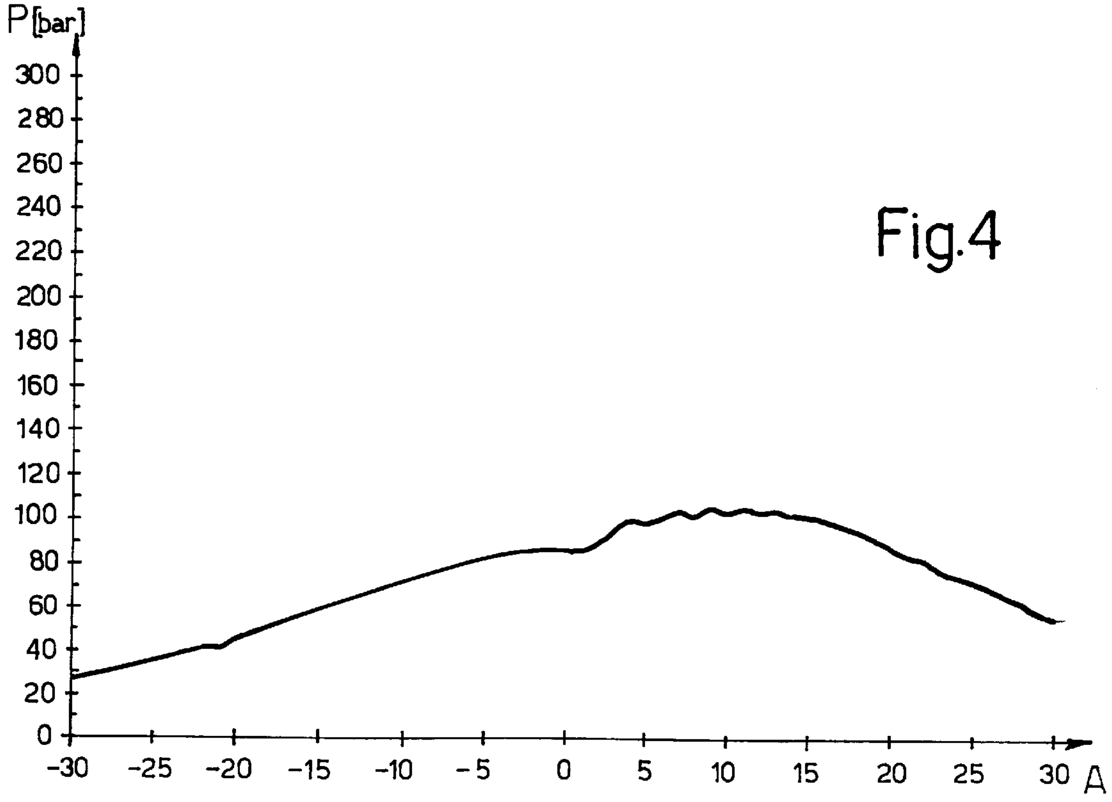
Figure 5:
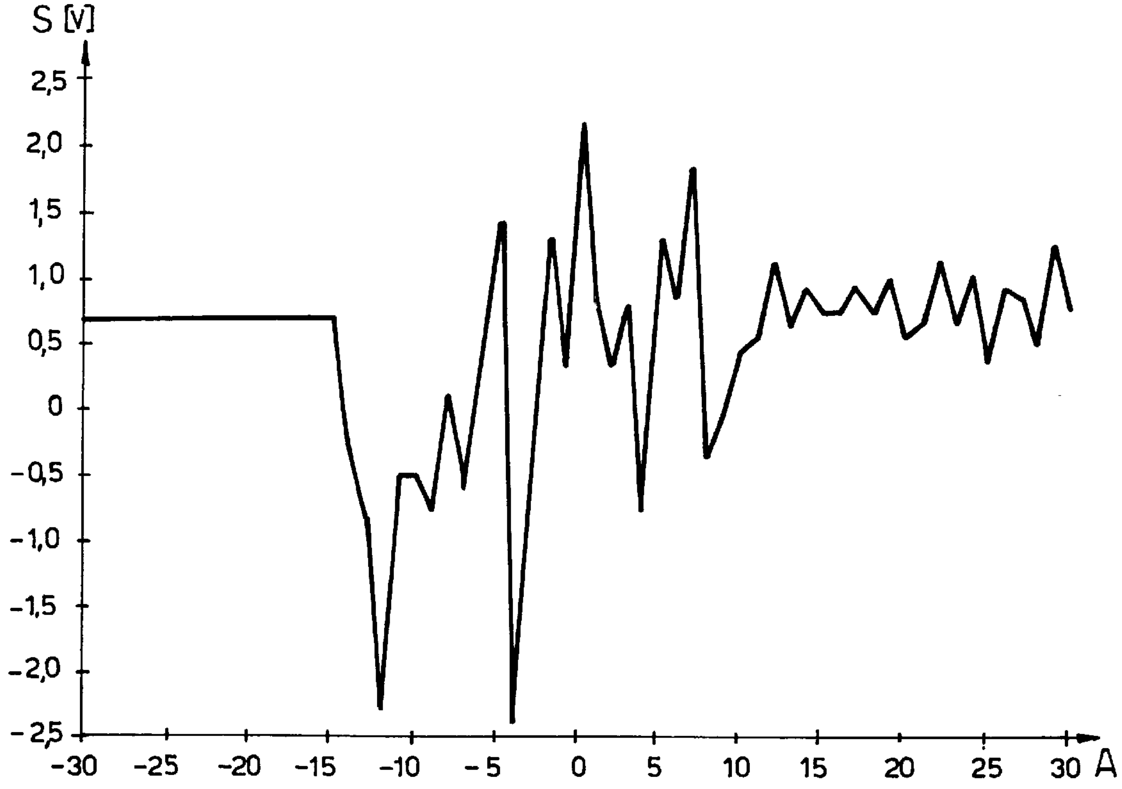
Figure 6:
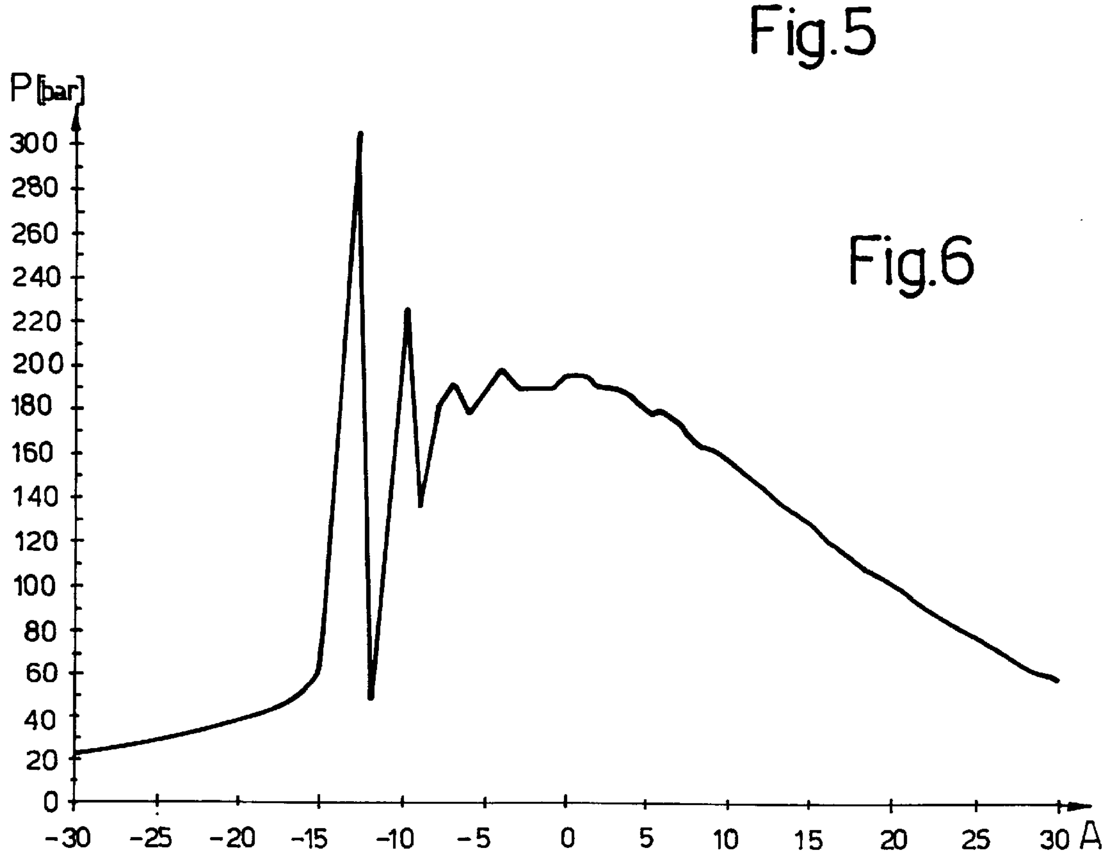

More specifically, FIGS. 3 and 4 show graphs of acceleration signal S and the pressure P inside cylinder 4 as a function of drive angle A, and under correct operating conditions of injector 7; while FIGS. 5 and 6 show graphs of the same quantities with injector 7 jammed in the open position.

As can be seen, an injector 7 jammed in the open position causes a pressure peak inside cylinder 4, and a considerable increase in the intensity of vibration on block 3 of engine 2.

Moreover, as shown in FIGS. 3 and 5, when injector 7 is jammed in the open position, acceleration signal S begins oscillating well in advance with respect to correct operation of the injector, i.e. even before the instant at which the injection start command is given.

As is known, fuel is injected in advance with respect to the top dead center position (zero drive angle A). Therefore, when the injector is operating correctly, ignition occurs roughly at the top dead center position, and acceleration signal S oscillates slightly, due to combustion, following the top dead center position.

Conversely, when injector 7 is jammed in the open position, combustion occurs in advance, and the corresponding acceleration signal S (FIG. 5) oscillates considerably and well in advance of the top dead center position. Therefore, by comparing the amplitude of acceleration signal S with a predetermined reference amplitude value $S_{th}$, and by determining the drive angle (crossover angle) $A_o$ at which said amplitude exceeds reference value $S_{th}$, it is possible to determine the presence of an injector 7 jammed in the open position.

As shown in FIG. 2, therefore, after acquiring acceleration signal S and position signals $\Phi_1$ and $\Phi_2$ (block 25), the measured value of the amplitude of acceleration signal S is compared with a predetermined reference amplitude value $S_{th}$ (block 26).

If the measured value is greater than reference value $S_{th}$ (YES output of block 26), this means combustion is abnormal, and a fault indicator is generated. Conversely (NO output of block 26), combustion is normal and the diagnosis is terminated.

Comparing the amplitude of acceleration signal S with predetermined reference amplitude value $S_{th}$ would be sufficient in itself to diagnose an injector 7 jammed in the open position and so generate a fault signal indicating malfunctioning of injector 7.

For greater precision, however, and as shown in FIG. 2, a further check is made of the phase of acceleration signal S.

That is, the crossover angle $A_o$ at which acceleration signal S exceeds predetermined reference amplitude value $S_{th}$ is determined (block 27).

Crossover angle $A_o$ is then compared with a predetermined reference angle value $A_{th}$ equal or related to the drive angle at which fuel is injected into each cylinder 4 under normal combustion conditions (block 28).

If crossover angle $A_o$ is less than predetermined reference angle value $A_{th}$ (YES output of block 28), a jammed-open injector 7 is diagnosed, and a fault signal is generated (block 29) to indicate malfunctioning of an injector 7. Conversely (NO output of block 28), the diagnosis is terminated.

Alternatively, the diagnosis performed in blocks 25–29 is repeated cyclically to continually monitor operation of injection system 1.

The reference values $S_{th}$ and $A_{th}$ used in blocks 26 and 28 depend on the load and speed of engine 2, and are memorized in a map.

By also checking the phase of acceleration signal S on the basis of second position signal $\Phi_2$ supplied by second position sensor 19 on camshaft 6, it is possible to determine in which precise cylinder 4 combustion is occurring abnormally, by simply observing the phase of acceleration signal S with respect to the succession of explosion top dead center positions of individual cylinders 4.

In this case, upon detecting an injector 7 jammed in the open position, a fault signal may be generated (block 29) to indicate malfunctioning of the injector 7 supplying the cylinder 4 in which combustion is occurring abnormally, and possibly disconnect the injector 7 to prevent damaging engine 2.

The advantages of the present method are as follows. In particular, it provides for accurately determining the presence of an injector 7 jammed in the open position when both comparisons of acceleration signal S are made, and also for giving a reliable indication even in the event only the amplitude of the signal is compared.

Moreover, it provides for accurately determining which injector 7 is jammed in the open position.

Finally, the present method is straightforward, easy to implement, and requires only minor changes to injection system 1, i.e. the addition of a known acceleration sensor and a known device for processing the output signal of the sensor, in that the operations required may be performed directly by the electronic injection central control unit.

Clearly, changes may be made to the method as described and illustrated herein without, however, departing from the scope of the present invention.

For example, acceleration sensor 20 may be located on the cylinder head of the engine as opposed to block 3; or, as opposed to a single sensor 20, a number of acceleration sensors 20 may be located at different points of engine 2, in the event the amplitude of acceleration signal S generated by a single acceleration sensor 20 is not sufficient to determine malfunctioning of each cylinder 4.

We claim:

1. A method of diagnosing malfunctioning of injectors of an internal combustion engine high pressure injection system, characterized by comprising the steps of:

generating an acceleration signal (S) directly related to the intensity of vibration in an engine from combusting fuel in said engine;

comparing said acceleration signal with reference values ($S_{th}$, $A_{th}$), said reference values varying with speed and load of said engine; and determining a jammed open condition in any injectors of a direct fuel injection system for said engine, in the event of a predetermined relationship between said acceleration signal (S) and said reference values ($S_{th}$, $A_{th}$).

2. A method as claimed in claim 1, characterized in that said step of comparing said acceleration signal (S) with reference values ($S_{th}$, $A_{th}$) comprises the step of:

comparing the amplitude of said acceleration signal (S) with a predetermined reference amplitude value ($S_{th}$).

3. A method as claimed in claim 2, characterized in that said step of determining a jammed open condition comprises the step of:

generating a fault indicator (YES/NO) when the amplitude of said acceleration signal (S) exceeds said predetermined reference amplitude value ($S_{th}$).

4. A method as claimed in claim 3, characterized in that said step of comparing said acceleration signal (S) with reference values ($S_{th}$, $A_{th}$) also comprises the step of:

determining a crossover drive angle value ($A_o$) upon the amplitude of said acceleration signal (S) exceeding said predetermined reference amplitude value ($S_{th}$); and comparing said crossover drive angle value ($A_o$) with a predetermined reference angle value ($A_{th}$).

5. A method as claimed in claim 4, characterized in that said step of determining a jammed open condition comprises the step of:

generating a fault signal in the event said crossover drive angle value ($A_o$) is less than said predetermined reference angle value ($A_{th}$).

6. A unit for diagnosing malfunctioning of injectors of an internal combustion engine high-pressure injection system, characterized by comprising an acceleration sensor (20) coupled to an engine and operable to generate an acceleration signal (S) directly related to the intensity of vibration in an engine (2) from combusting fuel in said engine, comparing means (26, 28) connected to said acceleration sensor (20) to compare said acceleration signal (S) with reference values ($S_{th}$, $A_{th}$), said reference values varying with speed and load of said engine; and fault detecting means (29) for determining a jammed open condition in any injectors of a direct fuel injection system for said engine in the event of a predetermined relationship between said acceleration signal (S) and said reference values ($S_{th}$, $A_{th}$).

7. A unit as claimed in claim 6, characterized in that said comparing means (26, 28) comprise an amplitude comparator (26) for comparing the amplitude of said acceleration signal (S) with a predetermined reference amplitude value ($S_{th}$), and for generating a fault indicator (YES/NO) when the amplitude of said acceleration signal (S) exceeds said predetermined reference amplitude value ($S_{th}$).

8. A unit as claimed in claim 7, characterized by comprising phase detecting means (27) for generating a crossover drive angle value ($A_o$) upon the amplitude of said acceleration signal (S) exceeding said predetermined reference amplitude value ($S_{th}$); and in that said comparing means (26, 28) comprise a phase comparator (28) for comparing said crossover drive angle value ($A_o$) with a predetermined reference angle value ($A_{th}$).

9. A unit as claimed in claim 8, characterized in that said fault detecting means (29) comprise generating means for generating a fault signal when said crossover drive angle value ($A_o$) is less than said predetermined reference angle value ($A_{th}$).

10. A method of diagnosing malfunctioning injectors of a fuel injection system, comprising generating an acceleration signal directly related to intensity vibration caused by combustion in an engine of fuel received from injectors of a direct injection system;

comparing said acceleration signal with a reference value, said reference value varying with speed and load of said engine; and determining a jammed open condition in any of said injectors based on a predetermined relationship between said acceleration signal and said reference value.

11. A method according to claim 10, wherein said step of comparing comprises comparing said acceleration signal with a timing reference value related to which of said injectors is delivering fuel to said engine, said timing reference value varying with speed and load of said engine, and wherein said step of determining comprises determining which of said injectors is in said jammed open condition based on a predetermined relationship between said jammed open condition and said timing reference signal.

12. A method according to claim 11, wherein said timing reference value is related to the drive shaft angle in said engine.

13. A method according to claim 11, wherein said step of determining which of said injectors is in said jammed open condition comprises comparing a cross over drive shaft angle at which said jammed open condition occurs against said timing reference signal.

14. A method for diagnosing malfunctioning of injectors of a diesel engine high pressure injection system, characterized by comprising the steps of:

a) generating an acceleration signal (S) directly related to the intensity of vibration in a diesel engine from combustion fuel in said engine;

b) comparing said acceleration signal with references values ($S_{th}$, $A_{th}$; and c) determining a jammed open condition in any injector of a direct fuel injector system for said engine, in the event of a predetermined relationship between said acceleration signal (S) and said references values ($S_{th}$, $A_{th}$), said acceleration signal (S) being due to combustion occurring in advance of an instant for normal combustion.

15. A method as claimed in claim 14, characterized in that said step of comparing said acceleration signal (S) with reference values ($S_{th}$, $A_{th}$) comprises the step of:

comparing the amplitude of said acceleration signal (S) with a predetermined reference amplitude value ($S_{th}$).

16. A method as claimed in claim 15, characterized in that said step of determining a jammed open condition comprises the step of:

generating a fault indicator (YES/NO) when the amplitude of said acceleration signal (S) exceeds said predetermined reference amplitude value ($S_{th}$).

17. A method as claimed in claim 16, characterized in that said step of comparing said acceleration signal (S) with reference values ($S_{th}$, $A_{th}$) also comprises the steps of;

determining a crossover drive angle value ($A_o$) upon the amplitude of said acceleration signal (S) exceeding said predetermined reference amplitude value ($S_{th}$); and comparing said crossover drive angle value {$A_o$) with a predetermined reference angle value ($A_{th}$).

18. A method as claimed in claim 17, characterized in that said step of determining a jammed open condition comprises the step of:

generating a fault signal in the event said crossover drive angle value ($A_o$) is less than said predetermined reference angle value ($A_{th}$).

19. A unit for diagnosing malfunctioning of injectors of an internal combustion engine high-pressure injection system, characterized by comprising an acceleration sensor (20) coupled to an engine and operable to generate an acceleration signal (S) directly related to the intensity of vibration in an engine (2) from combusting fuel in said engine, said engine being a diesel engine and said acceleration sensor (20) being configured to generate said acceleration signal when combustion in said engine occurs in advance of an instant for normal combustion; comparing means (26, 28) connected to said acceleration sensor (20) to compare said acceleration signal (S) with reference values ($S_{th}$, $A_{th}$); and fault detecting means (29) for determining a jammed open condition in any injectors of a direct fuel injection system for said engine in the event of a predetermined relationship between said acceleration signal (S) and said reference values ($S_{th}$, $A_{th}$).

20. A unit as claimed in claim 19, characterized in that said comparing means (26, 28) comprise an amplitude comparator (26) for comparing the amplitude of said acceleration signal (S) with a predetermined reference amplitude value ($S_{th}$), and for generating a fault indicator (YES/NO) when the amplitude of said acceleration signal (S) exceeds said predetermined reference amplitude value ($S_{th}$).

21. A unit as claimed in claim 20, characterized by comprising phase detecting means (27) for generating a crossover drive angle value ($A_o$) upon the amplitude of said acceleration signal (S) exceeding said predetermined reference amplitude value ($S_{th}$); and in that said comparing means (26, 28) comprise a phase comparator (28) for comparing said crossover drive angle value ($A_o$) with a predetermined reference angle value ($A_{th}$).

22. A unit as claimed in claim 21, characterized in that said fault detecting means (29) comprise generating means for generating a fault signal when said crossover drive angle value ($A_o$) is less than said predetermined reference angle value ($A_{th}$).

* * * * *